Aug. 16, 1960 G. C. STOUT 2,949,256
APPARATUS AND METHOD FOR PREVENTING BACKLASH
IN STEERING MECHANISMS
Filed Oct. 2, 1956 3 Sheets-Sheet 2

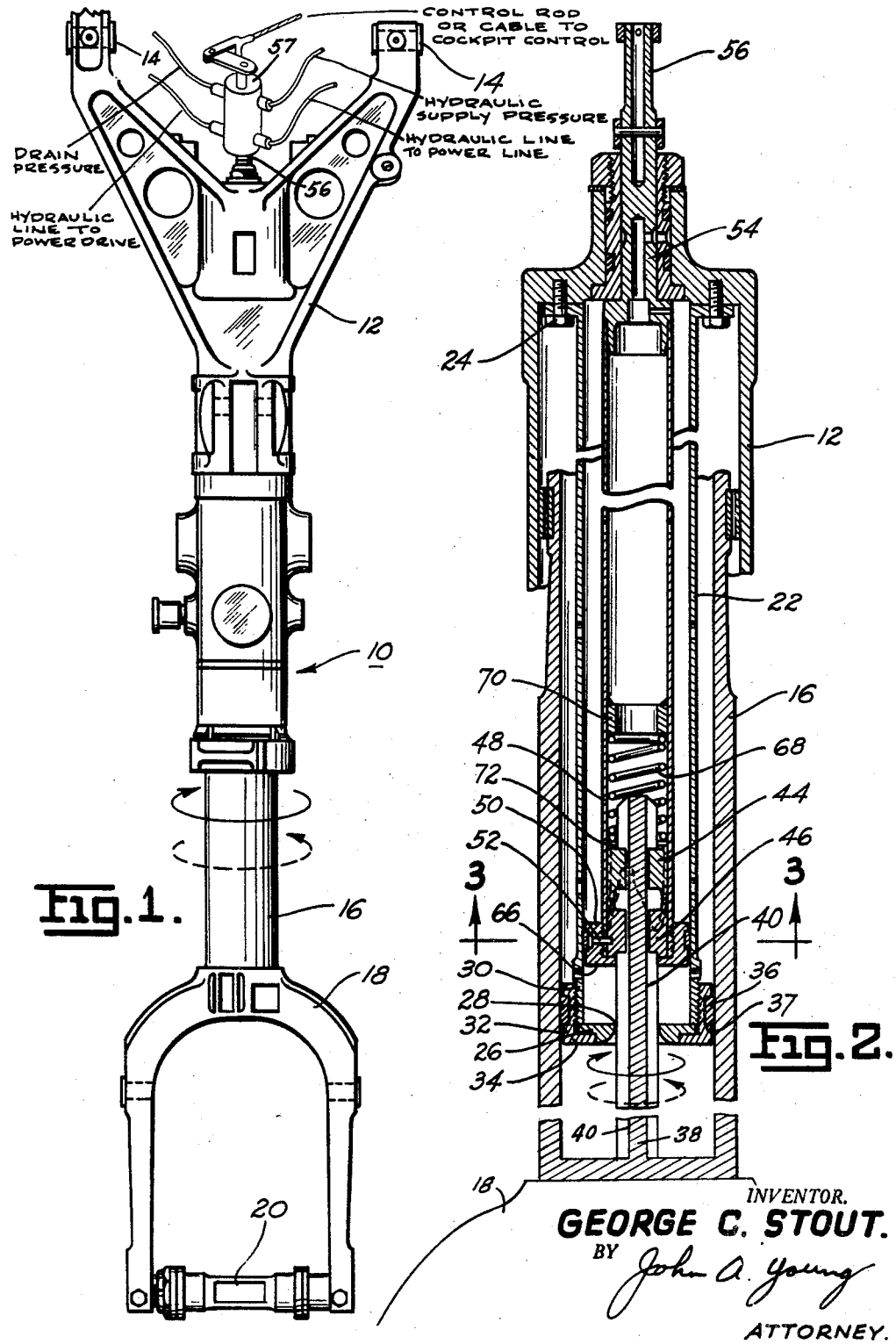

INVENTOR.
GEORGE C. STOUT.
BY John A. Young
ATTORNEY.

Aug. 16, 1960 G. C. STOUT 2,949,256
APPARATUS AND METHOD FOR PREVENTING BACKLASH
IN STEERING MECHANISMS
Filed Oct. 2, 1956 3 Sheets-Sheet 3

INVENTOR.
GEORGE C. STOUT.
BY
*John A. Young*
ATTORNEY.

United States Patent Office 2,949,256
Patented Aug. 16, 1960

2,949,256

APPARATUS AND METHOD FOR PREVENTING BACKLASH IN STEERING MECHANISMS

George C. Stout, South Bend, Ind., assignor to Bendix Aviation Corporation, South Bend, Ind., a corporation of Delaware Filed Oct. 2, 1956, Ser. No. 613,424

13 Claims. (Cl. 244—50)

This invention relates to both the apparatus and method for preventing what is known as "backlash" in a steering apparatus.

As described in this specification, the steering apparatus is used in combination with an aircraft nose wheel, but it will be understood that the system is usable for steering other dirigible wheels such as commonly found in automotive, tractor, and other ground vehicles.

It has been found that in power steering systems of aircraft nose wheel gears, wear occurs in the followup system of the steering so that there is eventually produced an objectionable clearance or lost motion that develops what is known as "backlash."

In the power steering apparatus selected for explanation of the invention, turning of the nose wheel is accomplished by power drive means which operates entirely remotely from the pilot's effort. The pilot makes a certain setting of the power control which determines the angularity through which the wheel is turned. In this system, the setting which is made by the pilot permits a power mechanism to drive the wheel until a limiting mechanism terminates steering. The limiting mechanism is "set" by operation of the power control, and when the wheel has turned through the selected angularity, the limiting mechanism terminates steering. What is desired, is that there be provided a means which is coupled to the limiting mechanism and is responsive to turning of the wheel in order that the degree of wheel turning will be communicated to the limiting mechanism.

The problem to be solved by this invention is the elimination of objectionable effects of clearance resulting from wear in the followup means communicating wheel turning to the limiting mechanism so that the extent of nose wheel steering is accurately communicated to the followup mechanism regardless of the extent of wear which normally occurs in the components of the followup mechanism. The result is a more controllable steering apparatus which does not develop backlash as a result of wear.

It is a further object of the invention to obtain the solution to this problem by means of structurally simplified components which are economical to manufacture and relatively simple to install.

Other features and objects of the invention will become apparent from a consideration of the following description which proceeds with reference to the accompanying drawings, wherein a plurality of the embodiments of the invention are illustrated by way of example.

In the drawings:

Figure 1 is a front view of a completed nose wheel strut which is steerable to direct the aircraft;

Figure 2 is an enlarged section view of the strut with the bottom portion removed and showing in detail various components of the followup mechanism;

Figure 5:
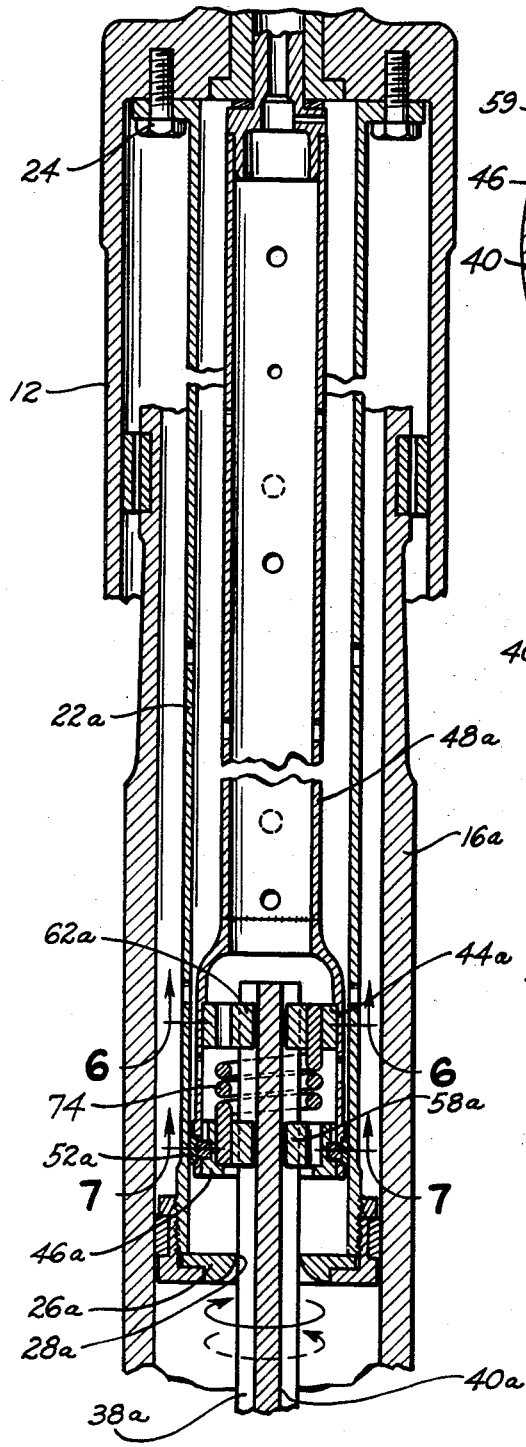
Figure 5 is a section view of the followup mechanism constituting a further embodiment of the invention.
Figure 6:
Figure 7:
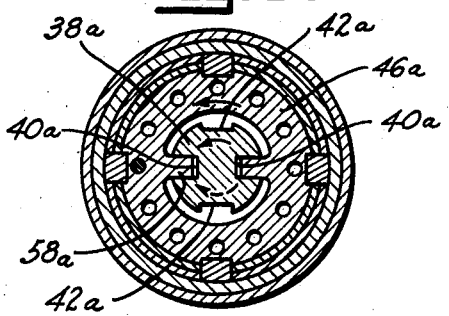
Figure 8:
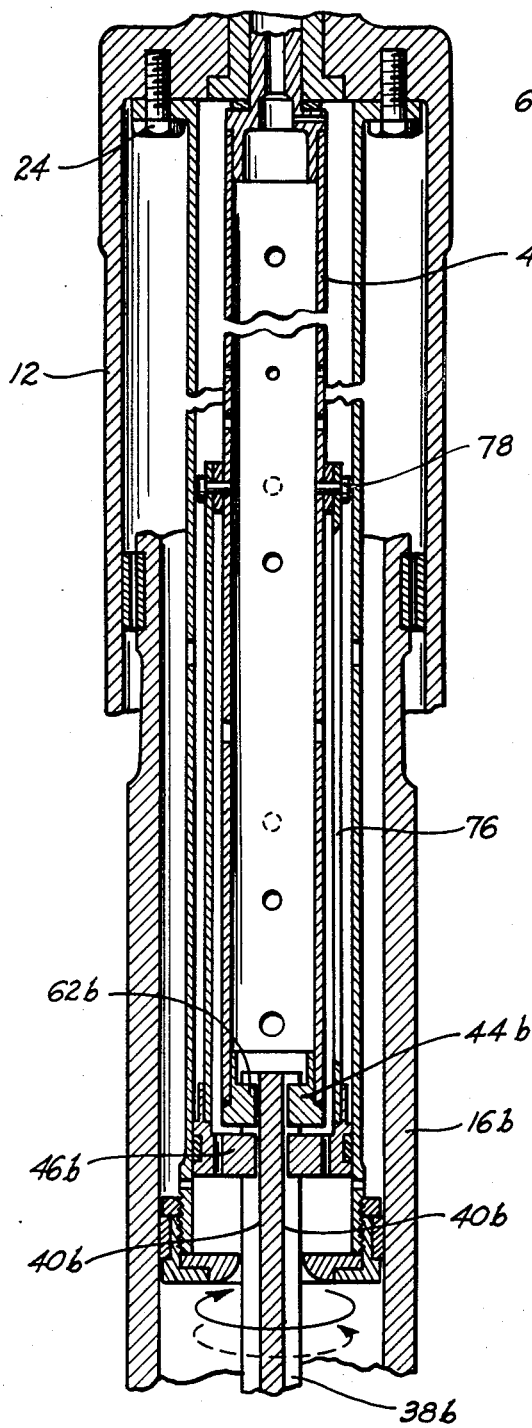

Figures 6 and 7 are section views taken on lines 6—6 and 7—7, respectively, of Figure 5;

Figure 8 is a detail view of a further embodiment of the invention; and

Figure 9:
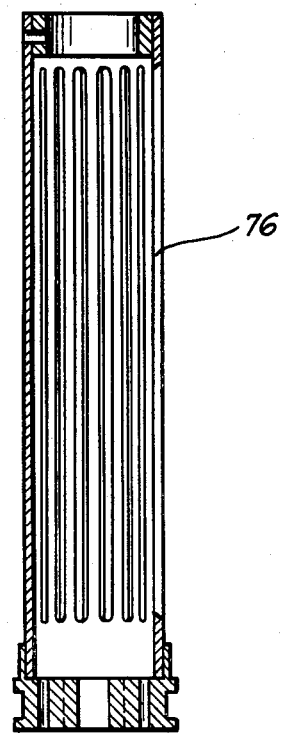

Figure 9 is a detail view of one of the driving members shown in Figure 8.

Referring first to the embodiment shown in Figures 1 through 4, the nose wheel strut is indicated generally by reference numeral 10. The strut 10 comprises an upper fixed tubular member 12 having trunnions 14 which pivotally support the nose wheel structure. At the lower end of the strut is a reciprocable tubular member 16 which is slidably received in fixed tubular member 12. A forked portion 18 of reciprocable tubular member 16 has an axle 20 which serves as the mounting for an aircraft wheel (not shown).

Referring to Figure 2, a fixed tubular member 22, which is secured at the upper end thereof to tubular member 12 by means of bolts 24, is provided with a diaphragm 26 having a metering orifice 28 formed therein. End 30 of the tubular member 22 is threaded to receive a nut 32 having a shoulder 34 which clamps the diaphragm 26 against the end of the tubular member 22. A sealing member 36 is mounted in a recess 37 of nut 32 to provide a fluid tight seal between the nut 32 and reciprocable tubular member 16.

Figure 3:
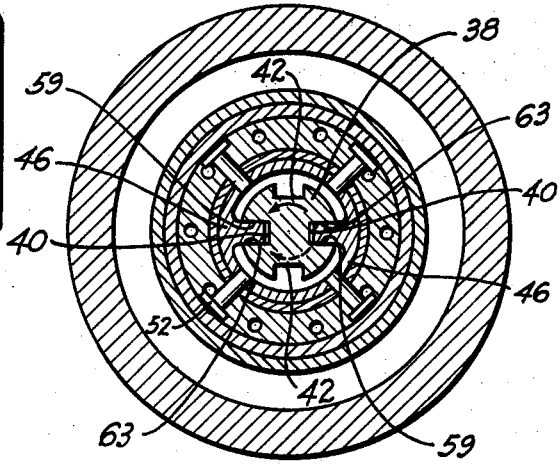
Figure 3 is a section view taken on line 3—3 of Figure 2.

A fluted metering pin 38 is connected with reciprocable tubular member 16 and it moves in unison with tubular member 16. Referring to Figures 2 and 3, the metering pin 38 is a solid pin having two sets of grooves 40 and 42 formed therein. The purpose of grooves 40 is that they serve as a keyway forming part of the followup mechanism. The grooves 40 are of constant depth but the grooves 42 vary in depth along the length of the metering pin 38 so as to vary the effective cross sectional area of orifice 28 through which fluid can be metered (see Figure 3).

Figure 4:
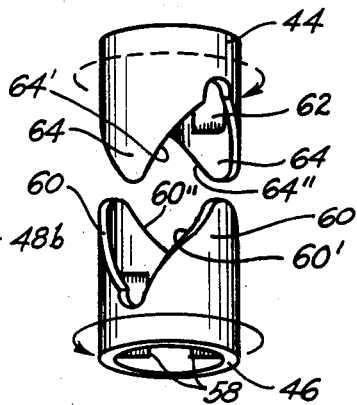
Figure 4 is an isometric exploded view of the driving members used in the steering system indicated in Figure 2.

Referring next to Figure 4, there are provided two driving members, an upper driving member 44 and a lower driving member 46. The lower driving member 46 is secured to a followup tubular member 48 by means of a nut 50 and a plurality of set screws 52 (Figures 2 and 3). The lower driving member 46 is thus clamped to followup tubular member 48 in a manner preventing relative rotation therebetween and thus rotational driving force may be imparted from driving member 46 to the followup tubular member 48. It will be noted from Figure 2 that the followup tubular member 48 is journalled at end 54 in a fixed part of the strut. An operative connection 56 is provided to connect with a limiting mechanism which forms part of conventional fluid control apparatus 57 connected to control the flow of pressurized servo fluid to a power drive, not shown, attached to the member 16. The fluid control apparatus may include a valve member, not shown, connected to control the flow of servo fluid as a function of the position of a pilot's control lever and follow-up valve member connected to control the flow of servo fluid as a function of the position of the member 16. The fluid control apparatus 57 including the limiting mechanism is not shown or described in detail since the valve apparatus contained therein and the operation of the same will be readily understood by those persons skilled in the art. It will be understood that the present invention is not limited to use with the fluid control apparatus shown but may be used with other steering control apparatus such as an electrically operated type in which case the operative connection 56 may drive a follow-up potentiometer or the like wired into the electrical system. The limiting mechanism is provided to terminate operation of the power drive exerted on tubular member 16.

Referring to Figure 4, there are two diametral keys 58 provided on the inner portion of driving member 46 and two cam lobes 60. The upper driving member 44 has two diametral keys 62 and two cam lobes 64 which are interfitted with lobes 60 on the lower driving member 46 so that the two driving members are drivably engaged in one direction. The two driving members 46 and 44 are apertured so that the metering pin 38 is reciprocable through both of them.

The keys 58 and 62 are slidably received in keyways 40 of the metering pin (Figures 2, 3). The lower driving member 46 (Figure 2) is supported by shoulder 66 of nut 50. Cam lobes 64 of the upper driving member 44 are held in engagement with the lobes 60 on lower driving member by means of a helical spring 68 which is compressed between a bushing 70 that is welded to the interior of followup tubular member 48 and a washer 72 which serves as a spring seat at the upper end of driving member 44.

As stated previously, the spring load 68 maintains the tapered cam lobes 60 and 64 of the respective driving members in forcible engagement, and as the upper driving member 44 moves downwardly the two driving members are caused to turn slightly, one relative to the other, in order to maintain the keys 62 and 58 in drivable engagement with opposite sides of the keyway 40.

When the driving members 44 and 46 are initially installed, the keys 58 and 62 are approximately the same width as the keyways 40 in the metering pin, but sufficiently loose fit is established to permit slidable movement of the metering pin. This is the condition of the keys 58, 62 and keyways 40 before any wear has occurred. In this condition, the cam lobes 60 and 64 are so contoured that they are in engagement with one another along only one side; thus, the side 64′ engages side 60′ of the lower driving member and 64″ of the upper driving member engages 60″ of the lower driving member. There is a clearance between the opposite sides of the cam lobes which decreases as the keys 58 and 62 wear. Thus, as slidable movement of the metering pin abrades and wears away the engageable sides of the keys 58 and 62 to reduce the thickness thereof, the upper driving member 44 will be forced downwardly relatively to the lower driving member 46 and the engaging cam lobe surfaces 64′—60′ and 60″—64″ will impart a relative turning movement of the upper driving member 44 to maintain the keys 58 and 62 in drivable engagement with opposite sides of the keyway 40.

It will be noted that the followup mechanism does not interfere with vertical reciprocable movement of the metering pin 38. Thus, steering and followup actuation (and wear compensation) is provided without interference with normal strut operation. Also, it is possible to steer the nose wheel of the strut during landing so that while the strut is contracting a turning force may be imposed on the wheel to obtain the desired steering.

In operation, the pilot by means of a suitable control device selects a certain steering angle and thereupon a power mechanism exerts torque on the reciprocable tubular member 16 to turn the wheel. When the pilot selects the steering angle, there is concurrently provided a setting for the fluid control apparatus 57 which is operatively connected to the follow-up mechanism through end 56. The follow-up mechanism is designed to terminate the power operation mechanism when the specified wheel angularity is obtained.

The followup mechanism is actuated by wheel turning to terminate the driving cycle when the end 56 of follow-up tubular member 48 has rotated through a specified angularity corresponding to the wheel angularity called for by the pilot. It will thus be seen that the primary power mechanism is actuated and de-actuated by remote control means.

Assume that the pilot has actuated the steering mechanism so that the power device will rotate the reciprocable tubular member 16 in the direction indicated by the solid arrow in Figure 1. When the reciprocable tubular member 16 is thus rotated, the metering pin 38 will also be rotated in the same direction as indicated by the solid arrow in Figure 2 since the two are held rigidly together.

Referring next to Figure 3, it will be seen that this rotation of the metering pin 38 will drive the lower driving member 46 in a like direction about the axis of the strut since the keys 58 of the lower driving member 46 are held in tight engagement with sides 59 of the keyways 40 in the strut.

As mentioned previously the keys 58 of the lower driving member will tend to wear because of the abrasion from sliding movement of the keys within the keyways of the metering pin, but regardless of the extent of wear of the keys 58 in the lower driving member, the keys will be maintained in tight engagement with sides 59 of the keyways 40.

As described, the rotation of metering pin 38, acting through the lower driving member 46, will produce the same degree of movement of followup tubular member 48 and the end 56 which is thus rotated will then operate the fluid control apparatus 57 to deactuate the power drive steering mechanism when the angularity of movement of the followup member 56 corresponds to the angularity called for by the pilot's control mechanism.

Assume next that the pilot wishes to turn the wheel in the opposite direction, such that the lower tubular member 16 will rotate in the direction indicated by the dashed line arrow in Figure 1. This direction of rotation of lower tubular member 16 will turn the metering pin 38 in a like direction indicated by the dashed line arrow in Figure 2 and in this case the sides 63 of the keyway 40 (Figure 3) are in drivable engagement with keys 62 of the upper driving member so that the upper driving member 44 is turned by rotation of the metering pin in the same direction (indicated by the dashed line arrow, Figure 4). The engaging cam lobes 64′—60′ and 64″—60″ cause the lower driving member 46 to be rotated in the same direction to thereby rotate the followup tubular member 48 therewith.

Thus, rotation of the metering pin 38 in one direction turns the followup tubular member 48 directly through the lower driving member 46 and in the opposite direction of rotation of the metering pin 38, the upper driving member 44 is turned, which in turn exerts turning force on the lower driving member 46 and thence to the follow-up tubular member 48. In all events, wear of the keys 62 in the upper driving member or wear of the keys 58 in the lower driving member will not result in any lost motion with the result that rotation of the metering pin 38 immediately causes the same degree of movement in the tubular member 48.

The resistance to turning of the followup mechanism 56 is not so great that the upper driving member 44 can be moved upwardly against the resistance of spring 68 so that when driving of the followup member 48 occurs through the upper driving member 44 there is no difference in the degree of movement of the metering pin 38 and followup tubular member 48.

Referring next to the embodiment shown in Figure 5, parts corresponding to those previously described will receive the same reference number with the subscript "a."

Tubular member 16a constitutes the lower reciprocal portion of the strut and is operatively fixed to metering pin 38a so that the two are reciprocal together. The inner tubular member 22a is fixed and is provided with a diaphragm 26a having a metering orifice 28a therein. Metering pin 38a has two sets of longitudinally formed slots 40a and 42a which serve respectively as keyways for the followup mechanism and to control the effective or metering area of the orifice 28a. The slots 40a which serve as the keyways are of a constant depth. The depth of slots 42a varies along the length of the metering pin to control the rate of fluid transfer across the metering orifice 28a.

The followup mechanism comprises a followup tubular member 48a and two driving members, an upper driving member 44a and a lower driving member 46a. The two driving members have keys 58a and 62a which are held in engagement with opposite sides of the keyway by means of a torsion spring 74 which tends to oppositely turn the two driving members one with respect to the other. Thus, the spring 74 tends to rotate the lower driving member (see Figure 7) in the direction of the arrow indicated, whereas the upper driving member is urged in the opposite direction as indicated by the arrow in Figure 6. Thus, when the metering pin 38a is turned in the direction indicated in Figure 5 the upper driving member 44a will be rotated since the sides of the keyways 40a are in locked engagement with keyways 62a, and rotation of the upper driving member will transmit a turning force through the spring 74 to the lower driving member which, being locked with the followup tubular member 48a through a spline 52a, will cause the followup member 48a to rotate in the same direction as the metering pin 38a.

When the metering pin 38a is rotated in the opposite direction as indicated by the dashed arrow in Figure 5 (indicated by the dash line in Figure 7), the metering pin being locked with the lower driving members through the keyways 40a and keys 58a will drive the lower driving member 46a to thereby turn the followup tubular member 48a independently of the upper driving member 44a.

The clock spring 74 maintains the keys 58a of the lower driving member in drivable engagement with one side of the keyway 40a and the keys 62a of the upper driving member 44a in engagement with the opposite side of the keyway. Thus, regardless of the extent of wear of the keys 58a and 62a there is a positive drive between the metering pin and the followup tubular member through the driving members in either direction and without lost motion therebetween so as to avoid any objectionable "backlash."

Referring next to the embodiment shown in Figures 8 and 9, parts corresponding to those previously described will receive the same reference number with the subscript "b."

In this embodiment the outer reciprocable tubular member 16b and metering pin 38b are joined together for reciprocable and rotary movement together.

The followup tubular member 48b moves responsively to rotation of the metering pin 38b through driving members 44b and 46b, respectively. The upper driving member 44b is fastened to one end of the followup tubular member 48b and the keys 62b of the driving member 46b are slidably interfitted with two keyways 40b in the metering pin 38b. The lower driving member 46b is carried at the end of a fluted tubular member 76 which is twisted in order to fit the driving member 46b into the keyway 40b of the metering pin 38b. When the member 76 is thus twisted, an opposite turning force is imposed on the upper and lower driving members 44b and 46b respectively, thus maintaining the key portions thereof in engagement with opposite sides of the keyway 40b. Thus, even though the driving members 48b and 62b should wear because of slidable engagement with the keyways, the keys will be maintained in contact with the opposite sides of the keyway. When the metering pin 38b is caused to turn in one direction indicated by the solid line arrow in Figure 8, the upper driving member 44b will be in drivable engagement with the keyway and the followup tubular member 48b will be directly turned. In the opposite direction of the rotation of the metering pin indicated by the dash line arrow in Figure 8, the keys of the lower driving member 46b will be in drivable engagement with the keyway and turning force will be exerted on the followup tubular member 48b through the member 76 which is connected thereto by means of pins 78. Functionally, the torsion tube 76 corresponds to the coil spring 74 in the previous embodiment or the cam lobes 60 and 64 of the first embodiment.

The principle involved in the embodiment in Figures 8, 9 is to maintain a torsional loading of the two driving members so that the keys are maintained in engagement with opposite sides of the keyway regardless of the extent of wear of the keys to thereby provide a positive driving connection through one or the other of the driving members depending upon the direction of rotation of the metering pin.

Each of the described embodiments has been successfully tested and used in steering systems for aircraft and each of them has operated effectively to eliminate the objectionable "backlash" in the steering apparatus.

A significant structural advantage of the driving members shown in Figure 4 is that these parts can be made as castings with very little or no machining. For example, the cam lobes can be cast and it is necessary only to machine the ends thereof.

It is apparent from the description of the several embodiments herein that there is provided a spring system which holds contact of the keyed driving members to prevent play or loose connections which might impair steering. The invention provides a controlled steering system which is characterized by absence of free play or lost motion in the controlling elements of the steering mechanism.

Numerous modifications and revisions of the invention will readily occur to those skilled in the art, and it is my intention to include such variations and revisions as embody the principles of the invention within the scope of the following claims.

I claim:

1. In an aircraft steering system the combination of: a power driven reciprocably movable first tubular member, a metering pin operatively secured to said first tubular member, and having grooved portions extending along the length thereof, a fixed metering orifice through which the metering pin is slidably movable, a tubular follow-up member which receives said metering pin at one end thereof, said tubular follow-up member being journalled at the other end thereof to permit rotatable movement of the follow-up member, means responsive to rotational movement of said follow-up member to control extent of steering, a first cam carried by said tubular follow-up member at said one end thereof and fixedly secured thereto, said first cam having a pair of keys received in the grooves of said tubular member and drivably engaging the sides of the grooves formed in said metering pin whereby rotational movement of said metering pin imparts torque to said follow-up member directly through said first cam, a second cam also having keys received in the grooves of said metering pin for drivable connection therewith, said first and second cam having interlocking inclined lobes whereby rotation of said metering pin in the opposite direction drives said second cam which acts through said first cams to impart a turning force on said follow-up member, and spring means urging said cams together so that the key portions thereof are maintained in engagement with opposite sides of the grooves in said metering pin regardless of wear of said lugs whereby operative drivable interconnection is maintained between said metering pin and follow-up member.

2. In a steering mechanism for aircraft landing gear, the combination of: a power driven reciprocable tubular member, a metering pin operatively carried by said power driven tubular member and having grooves formed along the length thereof, a rotatable follow-up member which is responsive to rotation of said metering pin and is arranged to permit reciprocable movement of the metering pin therein, a pair of cams having inclined interfitted lobe portions, said cams surrounding said metering pin and constructed to permit reciprocable movement of the metering pin relatively thereto, at least one key formed integrally with each of said cams and slidably received in the groove of said metering pin, a spring bearing against the end of one of said cams so that the inclined interfitted portions thereof produce opposed angular movement of the cams whereby the respective keys are held in tight engagement with opposite sides of the grooves formed in said metering pin, one of said cams being secured to the rotatable follow-up member so that rotation of the metering pin in one direction drives the follow-up member directly through the key of said one cam, the other of said cams being urged angularly so that the key thereof is driven by the metering pin in the opposite direction of rotation thereof whereby said other cam drives the first cam and follow-up member through the interengaged lobe portions thereof.

3. In a steering apparatus for aircraft landing gear assemblies, a follow-up mechanism which limits the extent of steering comprising a rotatable and reciprocable metering pin having longitudinal grooves forming keyways therein, a follow-up member responsive to rotation of said metering pin, two cam members arranged to receive the metering pin therethrough, interfitting inclined lobes of said cams which produce relative angular movement therebetween when forced together, at least one key formed on each of said cams and slidably received in the keyway of said metering pin to permit reciprocation of the metering pin relatively thereto, spring means yieldably urging said cams together whereby the key portions thereof are held in engagement with opposite sides of the keyway formed in said metering pin, one of said cams being fastened to the follow-up member so that rotation of the metering pin drives the follow-up member directly through said one cam, opposite direction of rotation of said metering pin serving to drive the other cam which acts through the interfitting cam lobes to turn said one cam and thereby said follow-up member.

4. In a steering apparatus having a follow-up device, a wear compensating means comprising a grooved metering member with the grooved portions constituting keyways therein, a pair of interfitted driving members having key portions slidably fitted within the keyways of said metering member, means urging opposite angular movement of said driving members whereby the key portions thereof are held against opposite sides of the keyway formed in said metering member, one of said driving members being fastened to the follow-up device so that rotation in one direction of the metering member drives the follow-up device directly through one of the driving members having the key portion locked with the keyway, and rotation in the opposite direction of the metering member drives the other driving member which acts through said one driving member in imparting motion to said follow-up device.

5. In a shock strut having relatively fixed and movable tubular members, a wear compensator in a driving mechanism comprising, a metering pin within said strut which is both rotatable and reciprocable and has a longitudinal keyway therein, a pair of interlocked driving members, means operatively connected to said driving members and urging said driving members angularly whereby they are held in engagement with opposite sides of the keyway in said metering pin, said driving members being arranged so that one is locked with the reciprocable member in one direction of rotation and the other is locked with the reciprocable member in the opposite direction of rotation whereby said members impart motion therethrough responsively to rotational movement of said rotatable member.

6. In a steering apparatus, a reciprocable and rotatable metering member, a rotatable follow-up member, and a wear compensating device interconnecting said metering member and follow-up member, said wear compensating device comprising two driving members having keys fitted within longitudinal keyways formed in said metering member to permit reciprocable movement of the metering member relatively thereto, a coil spring which is loaded by winding thereof and is fitted at the ends thereof with the respective driving members whereby the key portions thereof are held against opposite sides of the keyway in said metering member, one of said driving members being driven by the locked position of keyway and key portion thereof in one direction and the other of said driving members being driven by the locked position of keyway and key portion thereof in the opposite direction and transmitting turning force to said one driving member through the coil spring.

7. In a shock strut having relatively fixed and movable tubular members, a steering apparatus including a positively driven metering pin which is both rotatable and reciprocable in use, at least one keyway formed in said metering pin along the length thereof, a follow-up device adapted to be responsive to the rotational movement of said metering pin to thereby control the extent of steering, and a wear compensator operatively interconnecting said metering pin and follow-up device and comprising a pair of driving members having key portions slidably received in the keyways of said metering pin, means combined with said driving members to urge opposite angular movement of said driving members whereby the key portions thereof are held in engagement with said keyways so that clearance does not develop in the drive connection between said metering pin and driving members in either direction of rotation of said metering pin, means securing one of said driving members to the follow-up device and means interconnecting said driving members whereby rotation of the metering pin in one direction acts through both of said driving members and said interconnecting means to actuate said follow-up device, and rotation of the metering pin in the other direction acts through one of said driving members to actuate said follow-up device.

8. In a steering apparatus a rotatable and reciprocable metering pin, a follow-up device responsive to rotation of said metering pin to control the extent of steering, and means provided to operatively associate said metering pin and follow-up device and including driving members having keys slidably received in keyways formed in said metering pin, torsional means for urging said driving means angularly whereby the key portions thereof are maintained in engagement with the sides of the keyways for drivable connection of one or the other of the driving members in each direction of rotation of said metering pin, said torsional means serving to operatvely interconnect one of the driving members with said follow-up device.

9. In a steering apparatus a wear compensator comprising two concentric interconnected tubular members, a driving member carried at each of the ends thereof, a metering pin mounted for reciprocable movement within said tubular members and having a longitudinally constructed keyway formed therein, a plurality of keys formed integrally with said driving members and slidably received in said keyway, one of said concentric tubular members being twisted to develop torsional loading of both tubular members whereby the keys provided on said driving members are held against opposite sides of the keyway in the metering pin so that rotational movement of said concentric tubular members is immediately responsive to rotation of the metering pin regardless of wear of said keys, and a followup device operatively connected to said concentric tubular members and actuatable by rotation thereof to control the steering.

10. In a steering apparatus, a wear compensator comprising a tubular member having a keyway formed along the length thereof, two driving members having keys received in said keyways, torsional means urging said driving members angularly one relative to the other whereby said keys are maintained in contact with the sides of the keyway to retain a locked driving relation of the keyways and keys in either direction of rotation of the tubular member, said driving members being interconnected through said torsional means.

11. A wear compensator comprising a reciprocable member having at least one keyway formed longitudinally therein, a pair of driving members having keys fitted for slidable movement in said keyway, torsional means for spreading said driving members angularly to maintain the keys in engagement with the sides of the keyway regardless of wear of said keys and keyway whereby one of the driving members is locked with the reciprocable member in one direction of rotation, and the other driving member is locked with the reciprocable member in opposite direction of rotation, said driving members being interconnected by said torsional means to transmit driving force therebetween.

12. In a steering apparatus, a wear compensator comprising a reciprocable member having a keyway formed therein, two interlocked driving members having keys slidably received in said keyway for drivable connection therewith, and torsion means urging the driving members angularly whereby the key portions thereof are maintained in drivable connection with the keyway regardless of wear of said keys so that turning in either direction of the reciprocable member acts through the driving members without lost motion therebetween.

13. A process of compensating for wear in a drive mechanism comprising the steps of: providing a rotatable driven member having a keyway formed longitudinally therein, said rotatably driven member being reciprocable in operation, slidably interfitting key portions of driving members into said keyway to establish a drivable connection therebetween, imposing a torsional load on the driving members whereby the keys are maintained in drivable connection with the keyway in either direction of rotation of said rotatable member, and interlocking said drive members to provide for transmittance of force therebetween.

References Cited in the file of this patent

UNITED STATES PATENTS 2,376,678    Foster _____ May 22, 1945